US005121545A

United States Patent [19]

Nonaka et al.

[11] Patent Number: 5,121,545

[45] Date of Patent: Jun. 16, 1992

[54] ELECTRIC CIRCULAR SAW WITH IMPROVED BASE TILTING MECHANISM

[75] Inventors: Takuma Nonaka, Katsuta; Kimitaka Abo, Mito; Kouichi Sawada, Ibaraki; Junichi Kikuchi; Yoshio Osada, both of Katsuta, all of Japan

[73] Assignee: Hitachi Koki Company Limited, Tokyo, Japan

[21] Appl. No.: 627,465

[22] Filed: Dec. 14, 1990

[30] Foreign Application Priority Data

Dec. 15, 1989 [JP] Japan ............................ 1-145252[U]

[51] Int. Cl.[5] ...................... B23D 47/02; B23D 47/00; B23D 47/08

[52] U.S. Cl. ........................................ 30/376; 30/375; 30/377

[58] Field of Search ................. 30/374, 375, 376, 377, 30/390, 391

[56] References Cited

U.S. PATENT DOCUMENTS

| | | | |
|---|---|---|---|
| 2,761,474 | 10/1956 | Dolan | 30/376 |
| 3,903,600 | 10/1975 | Dalton | 30/376 |
| 4,856,394 | 8/1989 | Clowers | 30/376 |

FOREIGN PATENT DOCUMENTS

| | | | |
|---|---|---|---|
| 1005277 | 9/1965 | United Kingdom . | |
| 1024688 | 3/1966 | United Kingdom . | |

*Primary Examiner*—Douglas D. Watts
*Assistant Examiner*—Paul M. Heyrana, Sr.
*Attorney, Agent, or Firm*—Lowe, Price, LeBlanc & Becker

[57] ABSTRACT

An electric circular saw of the type including a mechanism for tilting a base relative to the plane of a blade is provided wherein a side knob for being gripped by the user during cutting operation pivotally connects the base and a body of the circular saw through a base attachment portion and a bevel plate having an arcuate guide groove extending through an angular distance corresponding to a tilt angle of the base relative to the blade. The side knob is threaded to the base attachment portion and movable together with the base when the base is tilted. The side knob is spaced from a guide surface of the base by a distance at least larger than a maximum radius of the side knob. The distance between the base and the side knob is constant regardless of the relative angular position of said base and the blade, so that circular saw can be held stably and hence is capable of performing an accurate cutting operation.

6 Claims, 6 Drawing Sheets

ELECTRIC CIRCULAR SAW WITH IMPROVED BASE TILTING MECHANISM

BACKGROUND OF THE INVENTION

1. Field of the Invention

The present invention relates generally to power saws, and more particularly to a portable electric circular saw having a mechanism for tilting a base relative to a saw body including a rotating round blade.

2. Description of the Prior Art

Conventional portable electric circular saws include, as shown in FIG. 8, a rotating round blade 1 driven by an electric motor received in a housing or body 2, a blade guard 3 integral with the body 2 and covering an upper part of the blade 1, and a base 4 operatively connected with the body 2 and movable in a direction parallel to the plane of the blade 1 for adjusting the depth of cutting of the blade 1. The base 4 is also tiltable relative to the plane of the blade 1. A side handle or knob 5 for being gripped by the user's hand is fastened to the body 2 through an upstanding base attachment portion 6 integral with the base 4. When the cutting depth of the blade 1 is to be changed, the side knob 5 is loosened to allow the base 4 to move vertically in a position, for example, indicated by broken lines. Thereafter, the side knob 5 is tightly fastened to lock the base 4 in position against displacement relative to the body 2. A bevel plate 7 is disposed in front of the base attachment portion 6 and relatively movably connected to the same by means of a threaded fastener 8 extending through an arcuate guide groove 9 in the bevel plate 7.

In order to provide a large range of adjustment of the cutting depth, the side knob 5 is disposed closely to the body 2 and the blade guard 3, as shown in FIG. 9. During cutting operation, the circular saw is held by the user's hands at two points B and C. Since the holding point B, namely the side knob 5, is located downstream of a cutting point A in the direction of cutting indicated by the arrow, a stable holding of the circular saw is difficult to obtain. With this unstable holding, a great muscle effort is needed to prevent snaking of the cutting line. When the blade 1 is tilted relative to the base 4, as shown in FIG. 10, the side knob 5 is displaced toward the upper left of the bevel plate 7 and hence is separated far from a guide surface of the base 4. With this location of the side knob, the circular saw is held unstably and, therefore, accurate cutting is difficult to attain.

SUMMARY OF THE INVENTION

With the foregoing drawbacks of the prior art in view, it is an object of the present invention to provide an electric circular saw having a side knob combined with a base tilting mechanism in such a manner that the circular saw can be held stably and is capable of performing an accurate cutting operation without undue muscle effort.

In brief, an electric circular saw of this invention includes a mechanism for tilting a base relative to the plane of a blade. A side knob for being gripped by the user during cutting operation pivotally connects the base and a body of the circular saw via a base attachment portion and a bevel plate, the bevel plate having an arcuate guide groove extending through an angular distance corresponding to a tilt angle of the base relative to the blade. The side knob is threaded to the base attachment portion and movable together with the base when the base is tilted relative to the blade. The side knob is spaced from a guide surface of the base by a distance at least larger than a maximum radius of the side knob for enabling the user to grip the side knob without interference with the base. The distance between the base and the side knob is constant regardless of the relative angular position of said base and the blade, so that the circular saw can be held stably and hence is capable of performing an accurate cutting operation.

More specifically, an electric circular saw of this invention comprises: a base for guiding a rotating round blade during cutting operation, the base having a guide surface; a body having a blade guard for covering the blade; and means for tilting the base relative to the body for adjustably setting an angle between the guide surface of the base and a plane of the blade, the base tilting mechanism including a bevel plate pivotally connecting the blade guard and the base, the bevel plate having an arcuate guide groove extending about a pivot axis of the bevel plate, a side knob for being gripped by the user during cutting operation, a base attachment portion disposed on the base and coextensive with at least a portion of the arcuate guide groove, and a threaded fastener for fastening the base attachment portion and the bevel plate through the arcuate guide groove, wherein the side knob is connected to the base attachment portion by the threaded fastener and is movable together with the base attachment portion and the base, and the base attachment portion is spaced from the guide surface of the base by a distance at least larger than a maximum radius of the side knob about a central axis of the side knob.

With this construction, the side knob serves as a grip handle and also as means for locking the base in a desired tilted position relative to the blade. The distance between the side knob and the guide surface of the base is constant at all times regardless of the relative angular position of the base and the blade. This enables the user to hold the circular saw stably and perform a cutting operation efficiently and accurately.

The above and other objects, features and advantages of the present invention will become more apparent from the following description when making reference to the detailed description and the accompanying sheets of drawings in which preferred structural embodiments incorporating the principles of the present invention are shown by way of illustrative example.

DETAILED DESCRIPTION OF THE PREFERRED EMBODIMENTS

Figure 1:
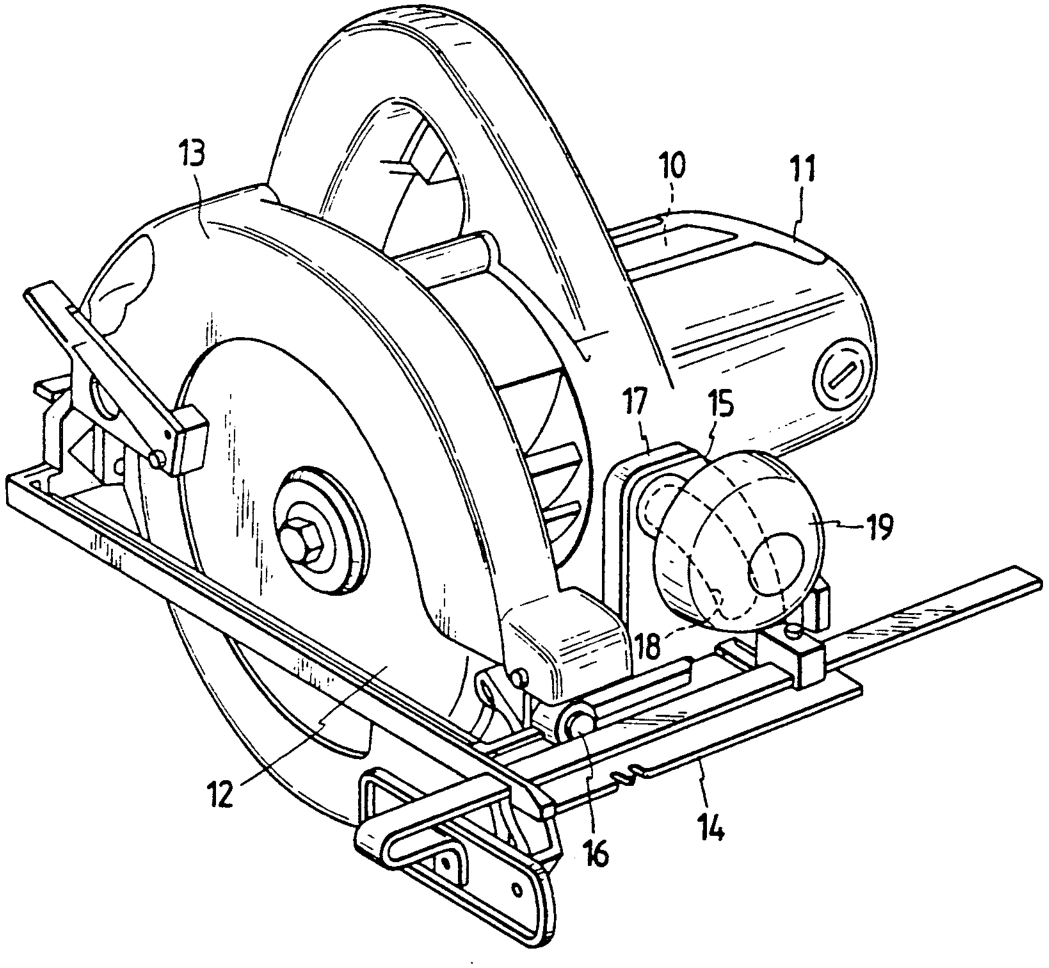
FIG. 1 is a perspective view of an electric circular saw with a base tilting mechanism according to the present invention.

Referring now to the drawings wherein like reference characters designate like or corresponding parts throughout several views, FIG. 1 shows a portable electric circular saw according to the present invention.

The circular saw includes an electric motor 10 mounted in a housing or body 11 for rotating a round blade 12. The round blade 12 is covered by an arcuate upper blade guard 13. The blade guard 13 is secured to the body 11 and pivotally connected to a base 14 by a bevel plate 15 as described below. The bevel plate 15 is integral with the body 11 and hence is movable together with the blade guard 13. The bevel plate 15 is pivotally connected with the base 14 and turns about a pivot axis 16 relative to the base 14 in such a manner that the round blade 12 covered with the blade guard 13 is tiltable relative to the general plane of the base 14 within an angle of 45 degrees. The base 14 includes an integral upstanding base attachment portion 17 disposed behind the bevel plate 15 and held in sliding contact with the bevel plate 15, the base attachment portion 17 having the same height as the bevel plate 15. The bevel plate 15 has a guide groove 18 extending arcuately about the pivot axis 16 and having a length corresponding to the tilt angle of 45 degrees. A side handle or knob 19 is secured to the base attachment plate 17 by a threaded fastener member described later and movable along the arcuate guide groove 18. The side knob 19 is normally positioned at an upper end of the arcuate guide groove 18. The side knob 19 is adapted to be gripped by the user hand when the user holds the circular saw during the cutting operation. The side knob 19 also serves to lock the bevel plate 15 in a desired tilted position relative to the base attachment portion 17.

Figure 2:
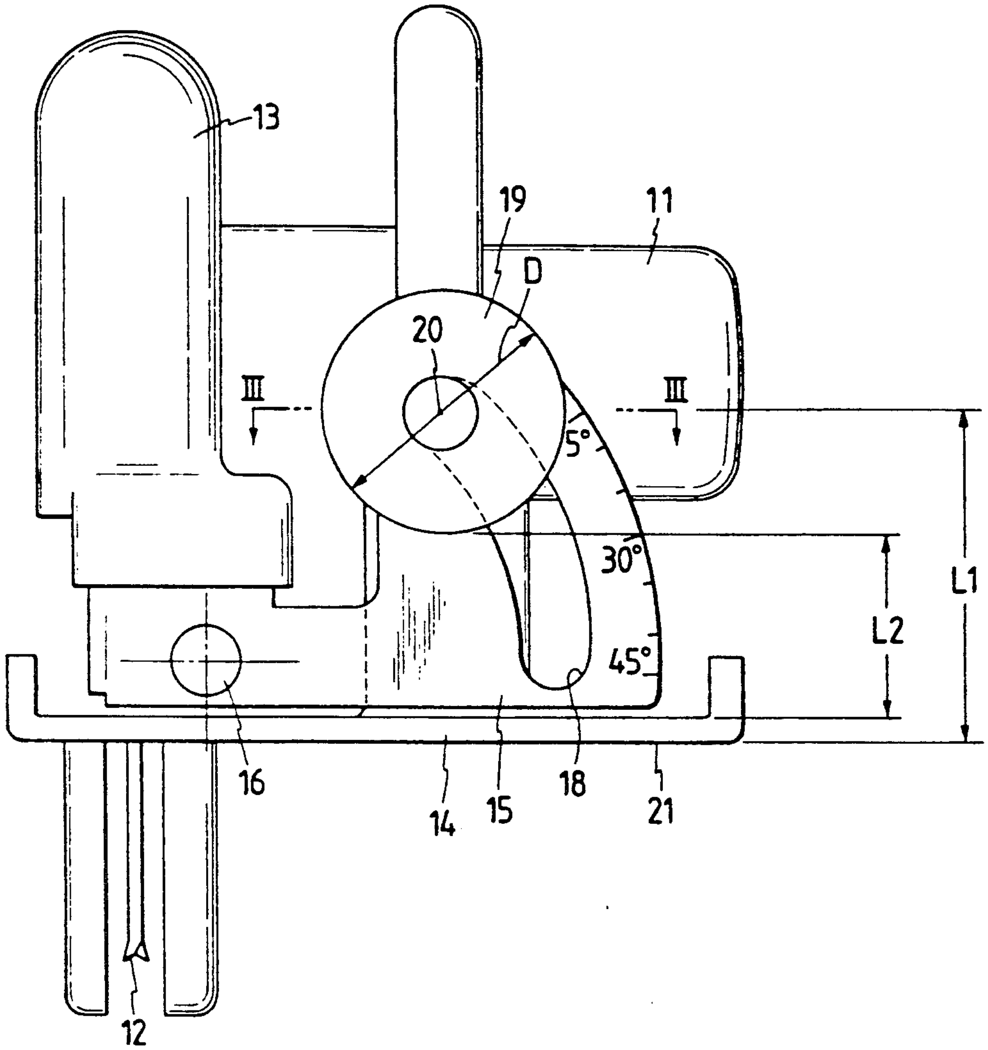
FIG. 2 is a front elevational view of the electric circular saw.

The side knob is rounded and, as shown in FIG. 2, has a central axis 20. This central axis 20 is spaced from a guide surface 21 of the base 14 by a distance L1 which is larger than a maximum radius D/2 of the rounded side knob 19 for a purpose described below. The side knob 19 is spaced from the base 14 by a distance L2 which is large enough to allow the user to grip the side knob 19 without interference with the base 14.

Figure 3:
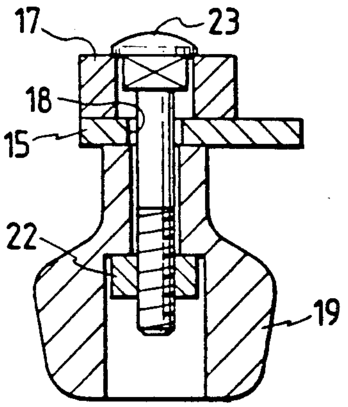
FIG. 3 is a cross-sectional view taken along line III—III of FIG. 2.

As shown in FIG. 3, a nut 22 is embedded in the knob 19 coaxially with the central axis 20 (FIG. 2) of the knob 19. The nut 22 is threaded with a bolt 23 extending through the base attachment portion 17 and the guide groove 18 in the bevel plate 15. The bolt 23 and the nut 22 jointly constitute the threaded fastener member stated above. With this threaded fastener member 23, 22, when the side knob 19 is turned in one direction about the central axis 20, the base attachment portion 17 and the bevel plate 15 are tightly fastened together. Conversely, when the base attachment portion 17 and the bevel plate 15 are to be loosened, the side knob 19 is turned in the opposite direction.

Figure 4:
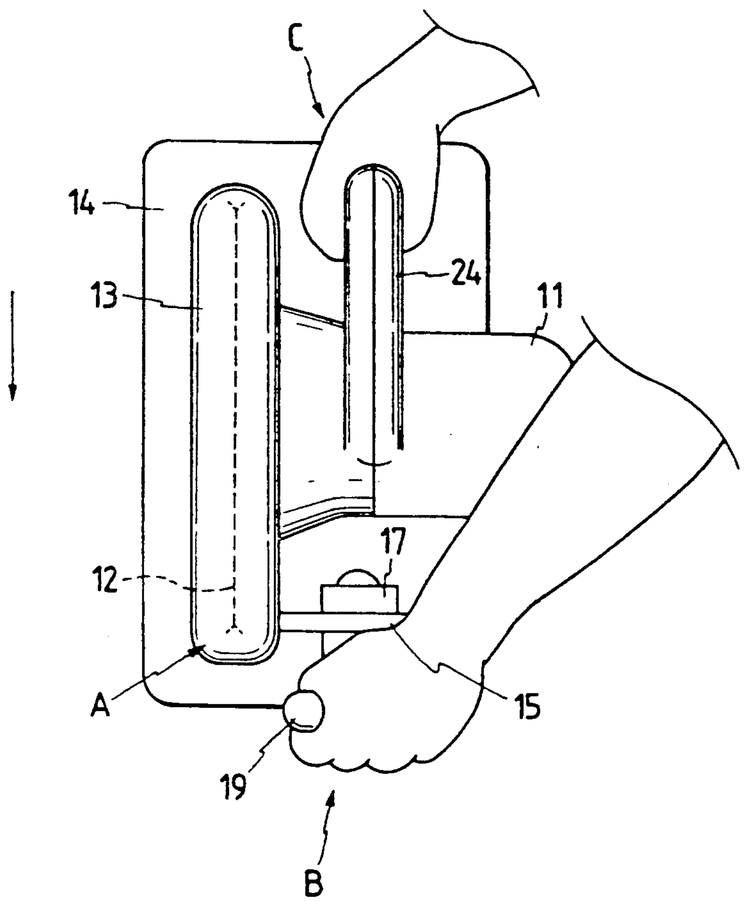
FIG. 4 is a plan view illustrative of the manner in which the electric circular saw is used.
Figure 9:
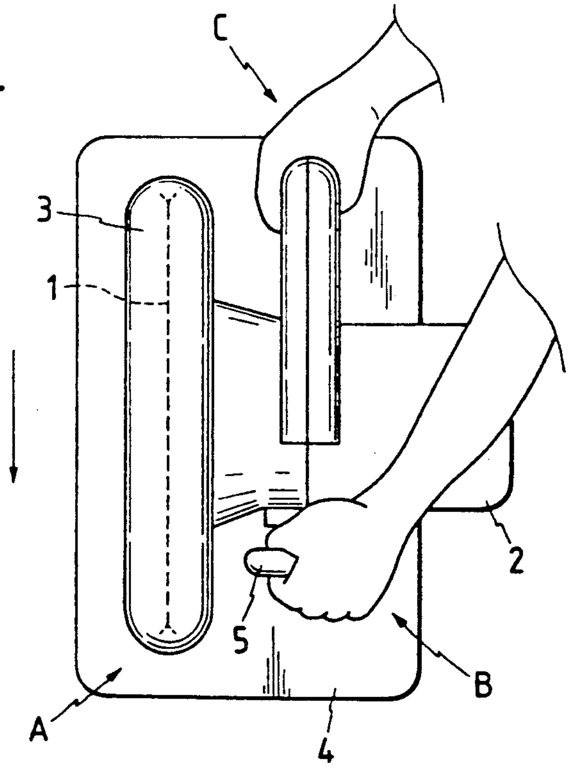
FIG. 9 PRIOR ART
FIGS. 9 and 10 are views illustrative of the manner in which the conventional circular saw is used.
Figure 10:
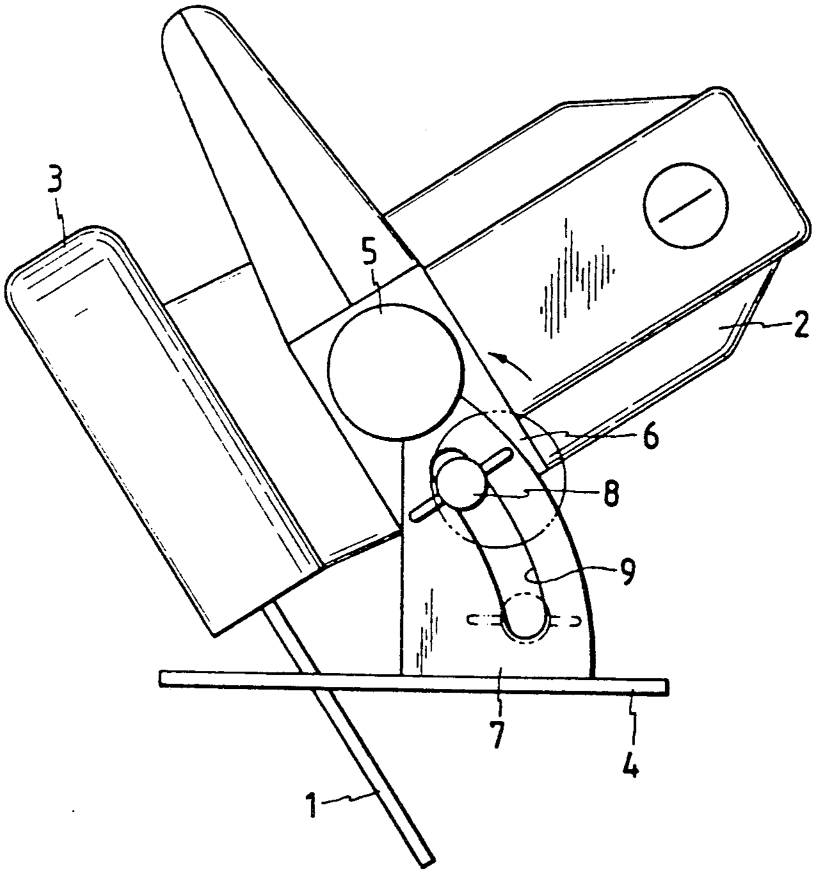
FIG. 10 PRIOR ART

While the circular saw of the foregoing construction is in use, the circular saw is held at two points B and C by being gripped at a handle 24 and the side knob 19, as shown in FIG. 4. The holding point B where the side knob 19 is gripped by the user's hand is located closer to a cutting point A and the front end of the base 14 than the holding point B of the conventional circular saw shown in FIG. 9. The side knob 19 is disposed upstream of the sawing point A in the direction of sawing indicated by the arrow. Furthermore, the distance between two holding points B and C is larger than the corresponding distance of the conventional circular saw shown in FIG. 9. With the holding point B thus positioned, the circular saw can be handled or controlled with a small muscle effort and hence cutting of a workpiece is performed accurately without snaking.

Figure 5:
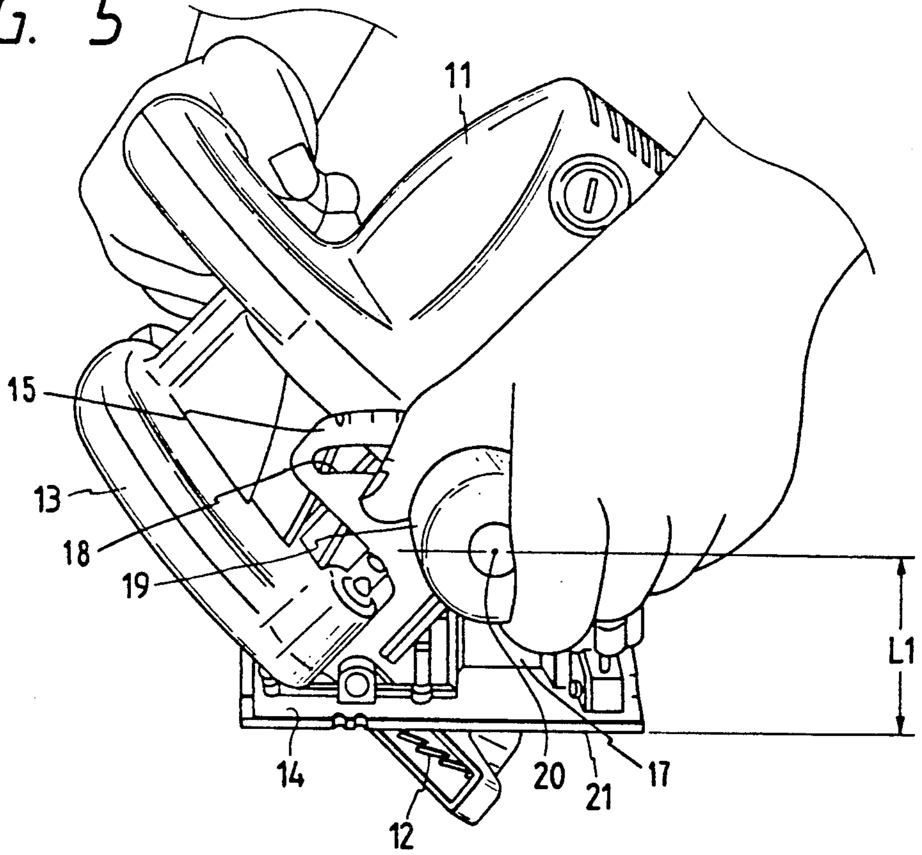
FIG. 5 is a perspective view showing the manner in which the electric circular saw is used with the base held in a tilted position.

As shown in FIG. 5, the distance L1 between the central axis 20 of the side knob 19 and the guide surface 21 of the base 14 is constant even when the blade 12 is tilted relative to the guide surface 21 of the base 14. Thus, the distance L1 is constant at all times regardless of the relative angular movement between the blade 12 and the base 14.

Figure 6:
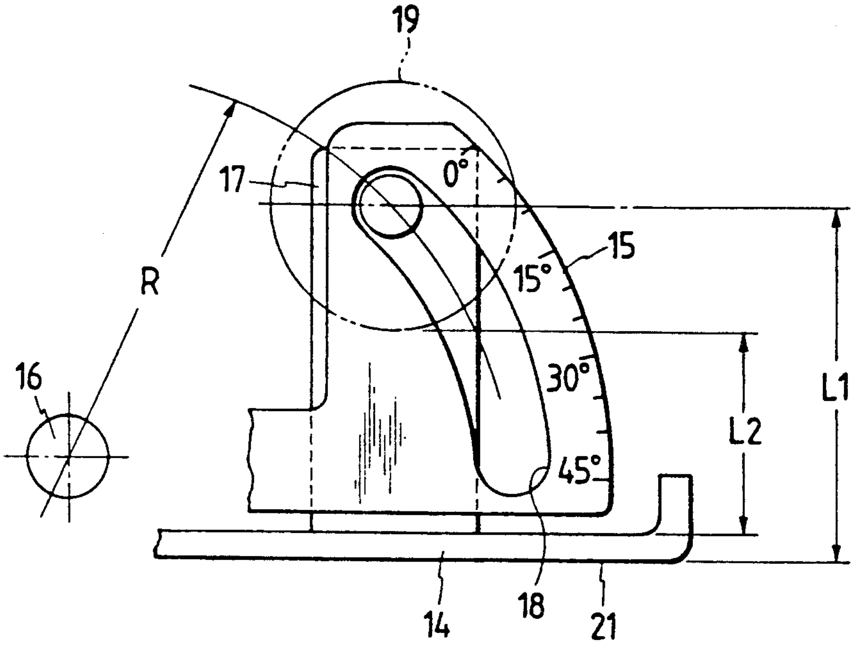
FIG. 6 is a front elevational view of a bevel plate of the base tilting mechanism and related parts of the electric circular saw shown in FIG. 2.

In the foregoing embodiment shown in FIGS. 1-4, the arcuate guide groove 18 extends throughout the tilt angle of 45 degrees, as also shown in FIG. 6. This is because the distance L2 is provided in order to avoid interference between the user's finger and the base 14 when the side knob 19 is gripped. This construction is particularly suitable for small-sized electric circular saws. However, in circular saws having a round blade of a relatively large diameter, the radius of curvature of the arcuate guide groove 18, i.e. the distance R between the pivot axis 16 of the bevel plate 17 and the central axis 20 of the side knob 19 is relatively large. Since the distance L1 increases with the radius of curvature R of the arcuate guide groove 18, the position of the side knob 19 is displaced far away from the guide surface 21 of the base 14. With this arrangement, a stable handling of the circular saw is difficult to obtain.

Figure 7:
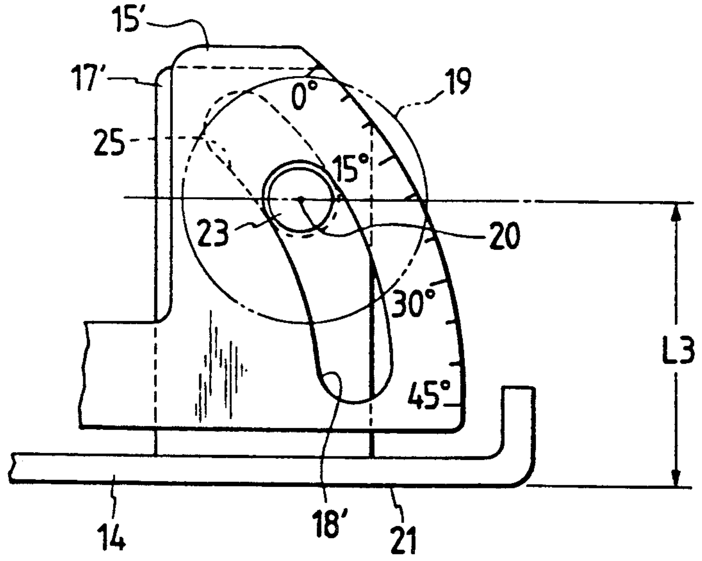
FIG. 7 is a view similar to FIG. 6, but showing a modified base tilting mechanism of this invention.
Figure 8:
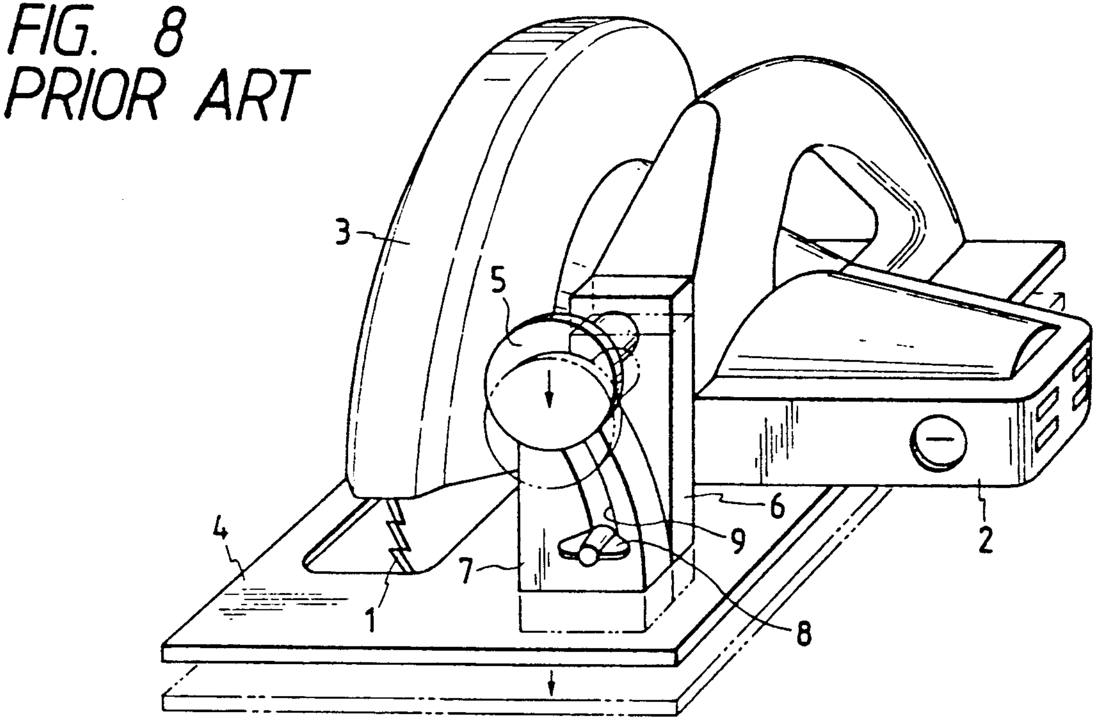
FIG. 8 PRIOR ART
FIG. 8 is a perspective view of a conventional electric circular saw.

FIG. 7 shows a base tilting mechanism according to another embodiment which is modified to cope with the foregoing problem associated with the large-sized circular saws. The modified base tilting mechanism includes a bevel plate 15' having an arcuate guide groove 18' extending through an angular distance corresponding to a tilt angle of about 30 degrees, and a base attachment portion 17' having an arcuate guide groove 25 (shown in FIG. 7 by a broken line) having the same radius of curvature as the guide groove 18' and extending contiguously from an upper end of the guide groove 18 through an angle of about 15 degrees. A bolt 23 extends though the guide grooves 25, 18'. To tilt the blade relative to the base 14 within an angle of 30 degrees, the bolt 23 slides relatively along the arcuate guide groove 18' while it is held in the lower end of the arcuate guide groove 25. When a tilt angle greater than 30 degrees is desired, the bolt 23 is displaced toward the upper end of the arcuate guide groove 25. According to this embodiment, the distance L3 between the central axis 20 of the side knob 19 and the guide surface 21 of the base 14 can be adjusted in a proper range which is suitable for the size of a circular saw to which the base tilting mechanism is incorporated.

As described above, the side knob which is adapted to be gripped by the user during cutting operation is also used to set the base at a desired tilted position relative to the blade. The side knob is spaced from the guide surface of the base by a distance which enables the user to hold the circular saw stably. This distance is constant at all the times regardless of the relative angular position between the base and the blade. The circular saw thus constructed is capable of perform an efficient and accurate cutting operation.

Obviously various minor changes and modifications of the present invention are possible in the light of the above teaching. It is therefore to be understood that within the scope of the appended claims the invention may be practiced otherwise than as specifically described.

What is claimed is:

1. An electric circular saw, comprising:

(a) a base for guiding a rotating round blade during cutting operation, said base having a guide surface;

(b) a body having a blade guard for covering said blade; and (c) means for tilting said body relative to said base for adjustably setting an angle between said guide surface of said base and a plane of said blade, said tilting means including (i) a bevel plate pivotally connecting said blade guard and said base, said bevel plate having an arcuate guide slot extending about a pivot axis of said bevel plate, (ii) a side knob for being gripped by the user during cutting operation, (iii) a base attachment portion disposed on said base and coextensive with at least a portion of said arcuate guide slot, and (iv) a threaded fastener operated by said side knob and provided for fastening said base attachment portion and said bevel plate, a portion of said threaded fastener being rotatably supported at a predetermined location in said base attachment portion and extending through said arcuate guide slot, whereby said side knob is threadedly connected to said base attachment portion by said threaded fastener and is movable together with said base attachment portion and said base relative to said body to vary said angle, an axis of said side knob being spaced from said guide surface of said base by a distance at least larger than a maximum radius of said side knob.

2. An electric circular saw according to claim 1, wherein:

said side knob is disposed forwardly of a cutting point of aid blade in a direction of cutting of said circular saw.

3. An electric circular saw according to claim 1, wherein:

said threaded fastener comprises a nut embedded in said side knob and a blt extending through said base attachment portion and said guide slot and threaded with said nut.

4. An electric circular saw according to claim 1, wherein:

said arcuate guide slot extends through an angular distance corresponding to a maximum angle between said guide surface of said base and said plane of said blade.

5. An electric circular saw according to claim 1, wherein:

said arcuate guide slot extends through an angular distance corresponding to a first portion of the maximum value of said angle obtainable between said guide surface of said base and said plane of said blade, said base attachment portion having an additional arcuate guide slot, said additional arcuate guide slot having the same radius of curvature as said guide slot and extending adjacent to and contiguously with said guide slot through an angular distance corresponding to the a second portion of said maximum angle between said guide surface of said base and said plane of said blade, said thread fastener including a bolt extending through said arcuate guide slot and said additional arcuate guide slot.

6. An electric circular saw according to claim 1, wherein said base attachment portion is integral with said base and said bevel plate is integral with said body and said blade guard.

* * * * *